United States Patent
Jung

(10) Patent No.: US 12,190,090 B2
(45) Date of Patent: Jan. 7, 2025

(54) UPDATE MANAGEMENT APPARATUS OF VEHICLE, OPERATING METHOD OF THE SAME, AND VEHICLE

(71) Applicants: Hyundai Motor Company, Seoul (KR); Kia Corporation, Seoul (KR)

(72) Inventor: Ho Jin Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 154 days.

(21) Appl. No.: 17/520,405

(22) Filed: Nov. 5, 2021

(65) Prior Publication Data

US 2022/0326933 A1 Oct. 13, 2022

(30) Foreign Application Priority Data

Apr. 7, 2021 (KR) .................. 10-2021-0045433

(51) Int. Cl.
*G06F 9/445* (2018.01)
*G01C 21/00* (2006.01)
*G06F 8/65* (2018.01)

(52) U.S. Cl.
CPC ........... *G06F 8/65* (2013.01); *G01C 21/3804* (2020.08)

(58) Field of Classification Search
CPC ... G06F 8/65; G06F 8/71; G06F 30/15; G06F 11/1433; G06F 21/572; G06F 9/44536; G06F 3/067; G06F 8/61; G06F 8/658; H04L 2209/84; H04L 63/123; H04L 67/125
USPC .................................................. 717/168–174
See application file for complete search history.

(56) References Cited

U.S. PATENT DOCUMENTS

| | | | |
|---|---|---|---|
| 2014/0109075 A1* | 4/2014 | Hoffman | G06F 11/1464 717/169 |
| 2018/0024826 A1* | 1/2018 | Caushi | G06F 8/65 717/172 |
| 2018/0081670 A1* | 3/2018 | Caushi | G07C 5/00 |
| 2022/0276851 A1* | 9/2022 | Nakahara | G07C 5/085 |
| 2023/0153099 A1* | 5/2023 | Ujiie | G06F 8/654 717/174 |

* cited by examiner

Primary Examiner — Chuck O Kendall
(74) Attorney, Agent, or Firm — Fox Rothschild LLP

(57) ABSTRACT

An update management apparatus for a vehicle includes an information managing device that obtains information associated with an update target controller from a wired updateable device in the vehicle and information associated with at least one controller from the at least one controller, and a determining device that determines whether the at least one controller needs to be updated based on the information associated with the update target controller and the information associated with the at least one controller.

15 Claims, 4 Drawing Sheets

UPDATE MANAGEMENT APPARATUS OF VEHICLE, OPERATING METHOD OF THE SAME, AND VEHICLE

CROSS-REFERENCE TO RELATED APPLICATION

This application claims under 35 U.S.C. § 119(a) the benefit of Korean Patent Application No. 10-2021-0045433, filed in the Korean Intellectual Property Office on Apr. 7, 2021, the entire contents of which are incorporated herein by reference.

BACKGROUND

(a) Technical Field

The present disclosure relates to an update management apparatus of vehicle, an operating method of the same, and a vehicle incorporating the update management apparatus.

(b) Description of the Related Art

With the rapid development of vehicle-related technologies, recent vehicles typically are equipped with dozens of controllers to control various electronic functions such as ABS, EPS, ADAS, and the like. For the maintenance and management of each controller, the continuous support of installed software is very important. Accordingly, to respond quickly and continuously to software bugs, deficiencies, etc., and to maintain the software in accordance with current laws and practices, software updates using over-the-air (OTA) technology is being developed.

However, in the case of an update using the OTA technology, since the update proceeds by wirelessly communicating with a server, updating is very difficult in situations where a network connection is not available. In this case, when there is a defect in the software installed in a main controller, it may be necessary to use a service center, or in a serious case, to recall the software.

SUMMARY

An aspect of the present disclosure provides a vehicle update management apparatus capable of performing an update of a vehicle even in a situation where wireless communication with an external server of the vehicle is impossible.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an update management apparatus of a vehicle includes an information managing device that obtains information associated with an update target controller from a wired updateable device in the vehicle, and obtains information associated with at least one controller from the at least one controller, and a determining device that determines whether the at least one controller needs to be updated, based on the information associated with the update target controller and the information associated with the at least one controller.

In an embodiment, the information associated with the update target controller may include version information of software for the update target controller, and the information associated with the at least one controller may include version information of software installed in the at least one controller, and the determining device may compare the version information of the software for the update target controller with the version information of the software installed in the at least one controller, and may determine that an update of the at least one controller is necessary, when the version information of the software for the update target controller is more recent.

In an embodiment, the apparatus may further include an updating device that performs an update of the at least one controller, when the determining device determines that the update of the at least one controller is necessary.

In an embodiment, the information associated with the update target controller may include information associated with an update of the update target controller, and the updating device may determine whether the at least one controller is in an updateable state, and may perform the update of the at least one controller based on the information associated with the update of the update target controller.

In an embodiment, the information managing device may request the wired updateable device in the vehicle to delete the information associated with the update target controller, when the update of the at least one controller is completed.

In an embodiment, the information managing device may obtain the information associated with the update of the update target controller from the wired updateable device in the vehicle, when the determining device determines that the update is necessary.

In an embodiment, the information associated with the update target controller may include at least one of a controller area network (CAN) ID, a firmware content, a software version, and an update sequence of the update target controller.

In an embodiment, the wired updateable device in the vehicle may be a navigation device, and the navigation device may store the information associated with the update target controller in a memory different from a memory in which map information is stored.

According to an aspect of the present disclosure, a method of operating an update management apparatus of a vehicle includes: obtaining, by an information managing device, version information of software installed in at least one controller; obtaining, by the information managing device, version information of software for an update target controller from a wired updateable device in the vehicle; determining, by a determining device, whether to perform an update based on the version information of the software installed in the at least one controller and the version information of the software for the update target controller; obtaining, by the information managing device, information associated with an update of the update target controller from the wired updateable device in the vehicle when it is determined to perform the update in the determining of whether to perform the update; and performing, by an updating device, the update based on the information associated with the update of the update target controller.

In an embodiment, the determining of whether to perform the update may compare the version information of the software installed in the at least one controller with the version information of the software for the update target controller, and may determine that an update of the at least one controller is necessary, when the version information of the software for the update target controller is more recent.

In an embodiment, the performing of the update may include determining whether the at least one controller is in an updateable state, and performing the update of the at least one controller based on the information associated with the update of the update target controller.

In an embodiment, the method may further include requesting the wired updateable device in the vehicle to delete the version information of the software for the update target controller and the information associated with the update of the update target controller, when the update is completed in the performing of the update of the at least one controller.

In an embodiment, the information associated with the update target controller may include at least one of a controller area network (CAN) ID, a firmware content, a software version, and an update sequence of the update target controller.

In an embodiment, the wired updateable device in the vehicle may be a navigation device, and the method may further include storing the version information of the software for the update target controller and information associated with the update of the update target controller in a memory different from a memory in which map information is stored in the navigation device.

According to an aspect of the present disclosure, a vehicle includes a wired updateable device that obtains information associated with an update target controller, and an update management apparatus that obtains information associated with at least one controller, determines whether the at least one controller needs to be updated based on the information associated with the at least one controller and the information associated with the update target controller received from the wired updateable device, and performs an update of the at least one controller.

In an embodiment, the information associated with the update target controller may include version information of software for the update target controller, the information associated with the at least one controller may include version information of software installed in the at least one controller, and the update management apparatus may compare the version information of the software for the update target controller with the version information of the software installed in the at least one controller, and may determine that the update of the at least one controller is necessary when the version information of the software for the update target controller is more recent.

In an embodiment, the information associated with the update target controller may include information associated with an update of the update target controller, and the update management apparatus may perform the update of the at least one controller based on the information associated with the update of the update target controller when it is determined that the update of the at least one controller is necessary.

In an embodiment, the wired updateable device may be a navigation device, and the navigation device may store the information associated with the update target controller in a memory different from a memory in which map information is stored.

In an embodiment, the update management apparatus may request the wired updateable device to delete the information associated with the update target controller, when the update of the at least one controller is completed.

In an embodiment, the information associated with the update target controller may include at least one of a controller area network (CAN) ID, a firmware content, a software version, and an update sequence of the update target controller.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
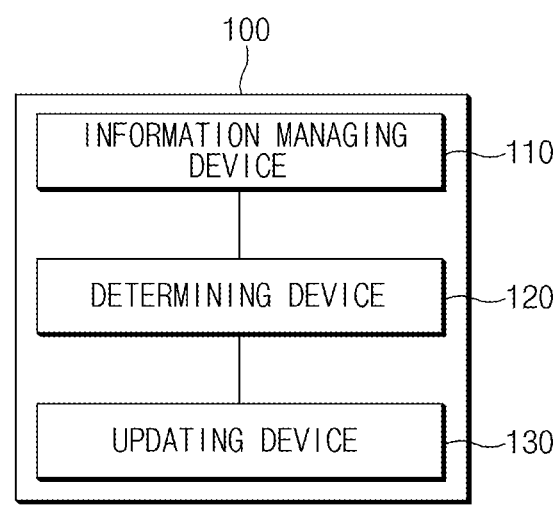
FIG. 1 is a block diagram illustrating an update management apparatus for a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an update management apparatus for a vehicle according to an embodiment of the present disclosure.

Referring to FIG. 1, an update management apparatus 100 for a vehicle according to an embodiment of the present disclosure may include an information managing device 110, a determining device 120, and an updating device 130.

The information managing device 110 may obtain information associated with an update target controller from a wired updateable device in the vehicle. In this case, the wired updateable device in the vehicle may be a navigation device. For example, the navigation device may store information associated with the update target controller in a memory different from a memory in which map information is stored.

The information associated with the update target controller, which is obtained from the wired updateable device in the vehicle by the information managing device 110 may include information associated with an update of the update target controller. For example, the information associated with the update of the update target controller obtained by the information managing device 110 may include at least one of a controller area network (CAN) ID, a firmware content, a software version, and an update sequence of the update target controller.

In addition, the information managing device 110 may obtain information associated with at least one controller from the at least one controller. For example, the information managing device 110 may obtain version information of software installed in the at least one controller from the at least one controller.

Meanwhile, when the determining device 120 determines that the update of at least one controller is necessary, the information managing device 110 may obtain the information associated with the update of the update target controller from the wired updateable device in the vehicle.

However, the information associated with the update target controller obtained from the wired updateable device in the vehicle is not limited to information associated with one update target controller. For example, the information managing device 110 may obtain information associated with a plurality of update target controllers from the wired updateable device in the vehicle.

The determining device 120 may determine whether the update of the at least one controller is necessary based on the version information of the software for the update target controller and the version information of the software installed in the at least one controller. For example, the determining device 120 may compare the version information of the software for the update target controller with the version information of the software installed in the at least one controller, and when the version information of the software for the update target controller is more recent, may determine that at least one controller needs to be updated. In particular, when the version information of the software for the update target controller is higher than the version information of the software installed in the at least one controller, the determining device 120 may determine that the update of the at least one controller is necessary.

The updating device 130 may determine whether the at least one controller is in an updateable state when the determining device 120 determines that the update of the at least one controller is necessary. For example, the updating device 130 may identify information such as whether a storage space of at least one controller is sufficient and whether vehicle communication (e.g., CAN communication) is connected, and may determine whether the at least one controller is in the updateable state.

The updating device 130 may perform the update of the at least one controller when it is determined by the determining device 120 that the update of at least one controller is necessary, and the at least one controller is in an updateable state. For example, the updating device 130 may perform the update of at least one controller based on the information associated with the update of the update target controller obtained from the wired updateable device in the vehicle by the information managing device 110.

When the update of at least one controller is completed in the updating device 130, the information managing device 110 may request the wired updateable device in the vehicle to delete information associated with the update target controller.

The update management apparatus 100 for the vehicle may manage the update for the vehicle through operations of the information managing device 110, the determining device 120, and the updating device 130 described above. Specifically, the update management apparatus 100 for the vehicle may obtain information associated with at least one controller from at least one controller in a situation where wireless communication with a server managing the update is impossible, and may obtain information associated with the update target controller from the wired updateable device in the vehicle. In addition, the update management apparatus 100 for the vehicle may determine whether the at least one controller needs to be updated, and may perform the update of the at least one controller based on the information associated with the update target controller.

In this case, the wired updateable device in the vehicle may be a navigation device. For example, the navigation device may store the information associated with the update target controller in a memory different from a memory in which map information is stored.

Hereinafter, an operating method of the update management apparatus 100 for a vehicle will be described with reference to FIG. 2.

Figure 2:
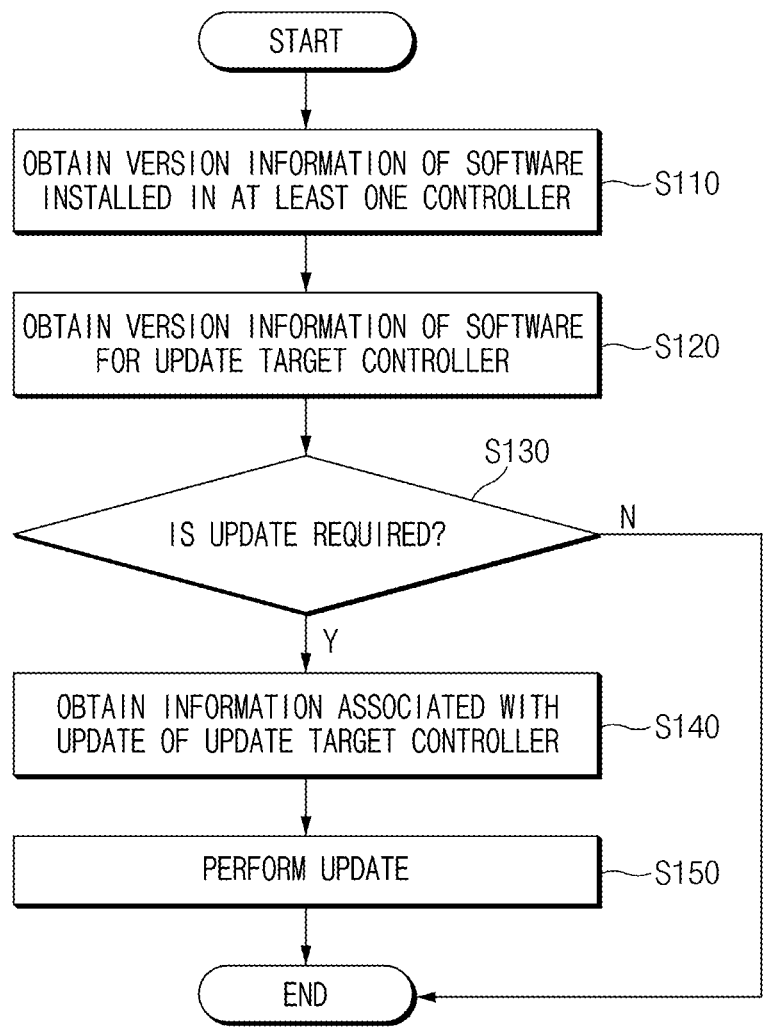
FIG. 2 is a flowchart illustrating an operating method of an update management apparatus for a vehicle according to an embodiment of the present disclosure.

FIG. 2 is a flowchart illustrating an operating method of an update management apparatus for a vehicle according to an embodiment of the present disclosure.

Referring to FIG. 2, the operating method of the update management apparatus 100 for a vehicle according to an embodiment of the present disclosure may include obtaining version information of software installed in at least one controller (S110), obtaining version information of software for the update target controller (S120), determining whether to perform the update (S130), obtaining information associated with the update of the update target controller (S140), and performing the update (S150).

Hereinafter, operations of S110 to S150 will be described in detail with reference to FIG. 1.

In the obtaining of the version information of the software installed in the at least one controller (S110), the information managing device 110 may obtain the version information of the software installed in the at least one controller. For example, the at least one controller may include a first controller and a second controller, and the information managing device 110 may obtain version information of software installed in the first controller and version information of software installed in the second controller.

In the obtaining of the version information of the software for the update target controller (S120), the information managing device 110 may obtain the version information of the software for the update target controller from the wired updateable device in the vehicle. However, the version information of the software for the update target controller obtained by the information managing device 110 is not limited to obtaining the software version information for one update target controller from the wired updateable device in the vehicle. In particular, the information managing device 110 may obtain version information of software associated with a plurality of update target controllers.

The obtaining of the version information of the software installed in the at least one controller (S110) and obtaining of the version information of the software for the update target controller (S120) are sequentially performed in FIG. 2 as described above, but is not limited thereto. For example, S120 may be performed before or simultaneously with S110.

In the determining of the whether to perform the update (S130), the determining device 120 may determine whether to perform the update based on the version information of the software installed in the at least one controller and the version information of the software for the update target controller. For example, in the determining of the whether to perform the update (S130), the determining device 120 may compare the version information of the software installed in the at least one controller with the version information of the software for the update target controller, and may determine that the update of the at least one controller is necessary when the version information of the software for the update target controller is more recent.

Meanwhile, in the determining of the whether to perform the update (S130), the determining device 120 may end an operation of the update management apparatus 100 for a vehicle when it is determined that the update of at least one controller is not necessary.

In the obtaining of the information associated with the update of the update target controller (S140), the information managing device 110 may obtain the information associated with the update of the update target controller from the wired updateable device in the vehicle. For example, in the obtaining of the information associated with the update of the update target controller (S140), the information managing device 110 may obtain the information associated with the update of at least one controller that requires the update from the wired updateable device in the vehicle when the determining device 120 determines that the update of at least one controller is necessary.

In particular, in the obtaining of the information associated with the update of the update target controller (S140), the information associated with the update of the update target controller obtained by the information managing device 110 may include at least one of a controller area network (CAN) ID, a firmware content, a software version, and an update sequence of the update target controller.

In the performing of the update (S150), the updating device 130 may perform the update based on the information associated with the update of the update target controller. In particular, the updating device 130 may determine whether the at least one controller is in an updateable state, and update the at least one controller based on the determination result.

In addition, the updating device 130 may determine whether the at least one controller is in the updateable state. For example, the updating device 130 may identify information such as whether the at least one controller is in use, whether a storage space of at least one controller is sufficient, and whether vehicle communication (e.g., CAN communication) is connected, and may determine whether the at least one controller is in the updateable state.

The updating device 130 may perform the update of the at least one controller based on the information associated with the update of the update target controller. For example, when it is determined that the at least one controller is in the updateable state, the updating device 130 may perform the update of the at least one controller in the updateable state based on the information associated with the update of the at least one controller in the updateable state.

Meanwhile, in the method of operating an update management apparatus for a vehicle according to another embodiment of the present disclosure, a wired updateable apparatus in the vehicle may be a navigation device. For example, in S120 and S140, the information managing device 110 may obtain software version information for the update target controller from the navigation device, and may obtain information associated with the update of the update target controller.

Figure 4:
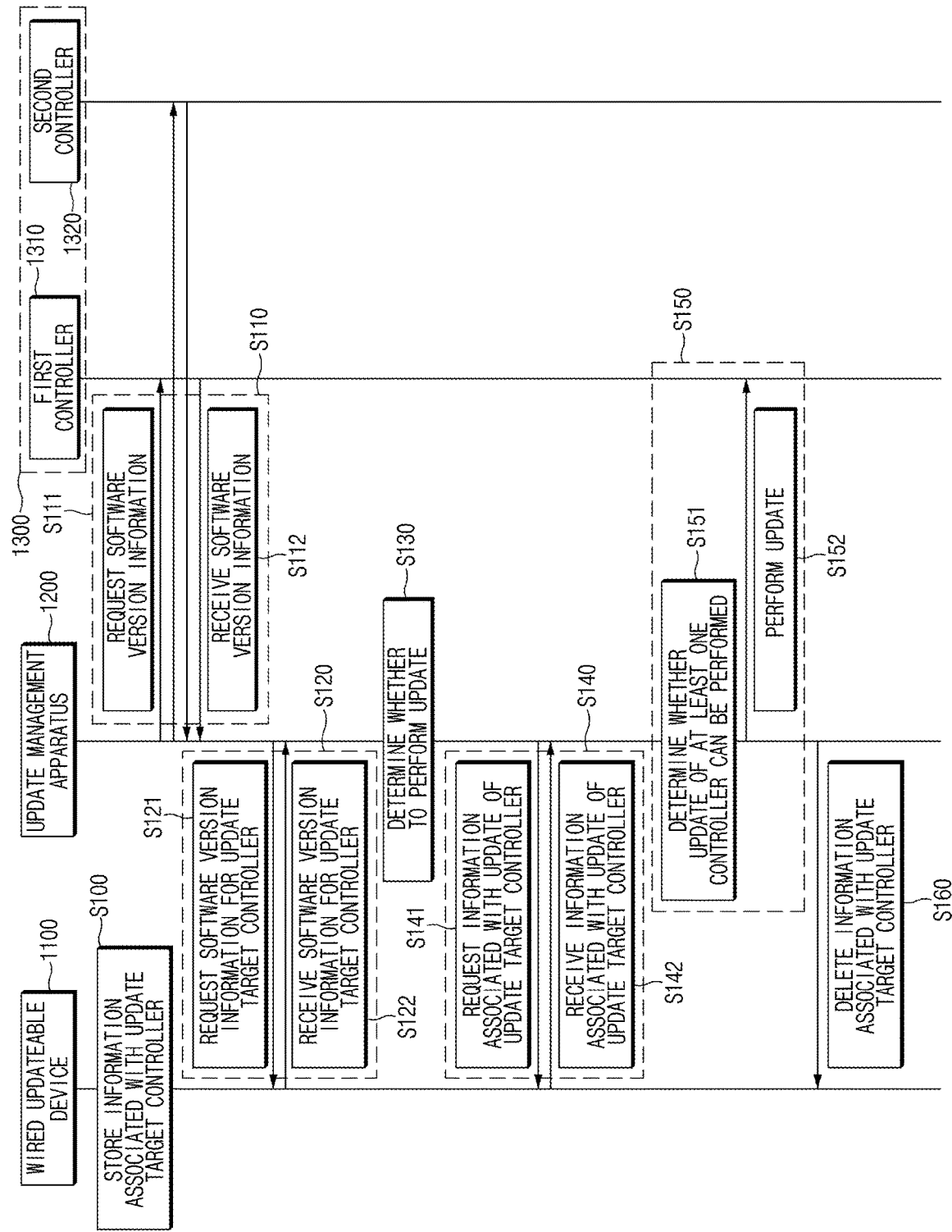
FIG. 4 is a flowchart illustrating an update management method for a vehicle according to an embodiment of the present disclosure.

In addition, in the operating method of an update management apparatus for a vehicle according to an embodiment of the present disclosure, the wired updateable device in the vehicle may be a navigation device, and the operating method may further include storing version information of the software for the update target controller and information associated with the update of the update target controller in a memory different from a memory in which map information is stored in the navigation device (S100, see FIG. 4).

In particular, the update management apparatus 100 for a vehicle may obtain the information associated with the update from the wired updateable device in the vehicle, based on the above-described operating method when wireless communication with an external update management server is impossible, and may perform the update of controllers that requires an update. Accordingly, the update management apparatus 100 for a vehicle may perform the update of the vehicle even in a network unavailable area.

Hereinafter, a vehicle according to an embodiment of the present disclosure will be described with reference to FIG. 3.

Figure 3:
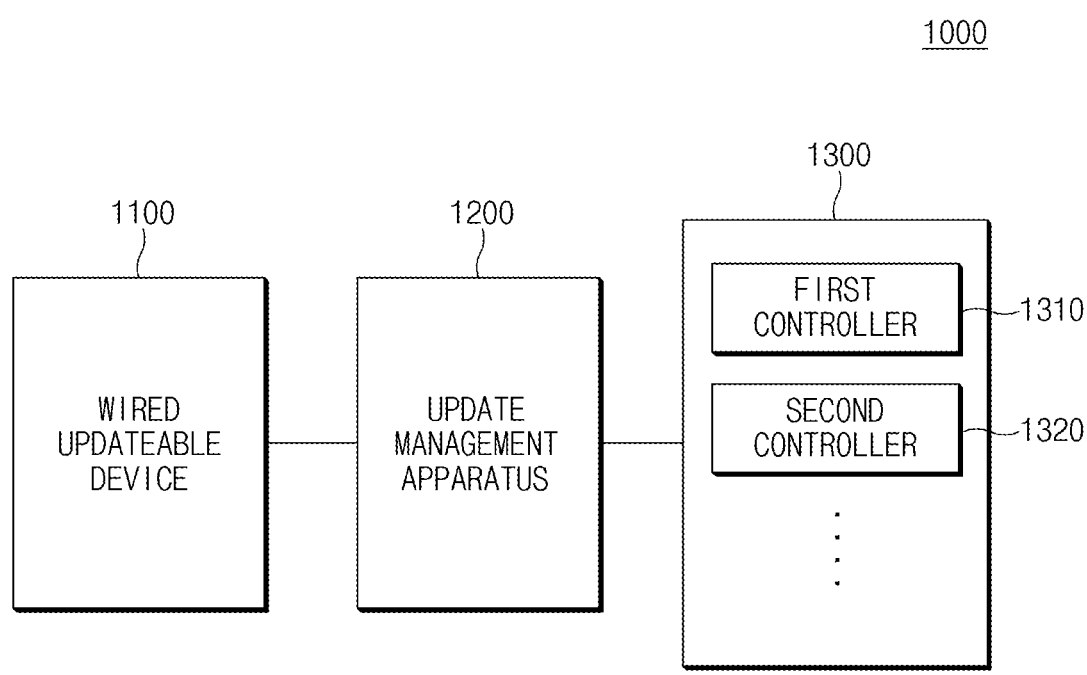
FIG. 3 is a diagram illustrating a vehicle according to an embodiment of the present disclosure.

FIG. 3 is a diagram illustrating a vehicle according to an embodiment of the present disclosure.

Referring to FIG. 3, a vehicle 1000 according to an embodiment of the present disclosure may include a wired updateable device 1100, an update management apparatus 1200, and a plurality of controllers 1300.

The wired updateable device 1100 may obtain information associated with an update target controller. For example, the wired updateable device 1100 may be a navigation device. In this case, the navigation device may store the information associated with the update target controller in a memory different from a memory in which the map information is stored.

Meanwhile, the information associated with the update target controller obtained by the wired updateable device 1100 may include version information of software for the update target controller and information associated with the update of the update target controller. For example, the information associated with the update of the update target controller may include at least one of a controller area network (CAN) ID, a firmware content, a software version, and an update sequence of the update target controller.

However, the information associated with the update target controller obtained by the wired updateable device 1100 is not limited to information associated with one update target controller. For example, there may be a plurality of update target controllers, and information associated with the plurality of update target controllers may be stored in the wired updateable device 1100.

The update management apparatus 1200 may obtain information associated with at least one controller. For example, the information on the at least one controller may include software version information installed in the at least one controller, and the update management apparatus 1200 may obtain software version information installed in the at least one controller. As another example, the update management apparatus 1200 may be a gateway.

The update management apparatus 1200 may obtain information associated with the update target controller stored in the wired updateable device 1100 from the wired updateable device 1100. For example, the update management apparatus 1200 may obtain software version information for the update target controller from the wired updateable device 1100, and may obtain information associated with an update of the update target controller.

The update management apparatus 1200 may determine whether an update of at least one controller is necessary based on the version information of the software installed in the at least one controller and the version information of the software for the update target controller obtained from the wired updateable device 1100. For example, the update management apparatus 1200 may compare the version information of the software installed in the at least one controller with the software version information for the update target controller, and may determine that at least one controller needs to be updated when the software version information for the update target controller is more recent.

When it is determined that the update of at least one controller is necessary, the update management apparatus 1200 may obtain information associated with the update of the update target controller from the wired updateable device 1100, and may perform the update of the at least one controller. For example, the update management apparatus 1200 may determine whether the at least one controller may perform the update, and when it is determined that the at least one controller is capable of performing the update, the update management apparatus 1200 may perform the update of the at least one controller based on the information associated with the update of the update target controller.

The update management apparatus 1200 may request the wired updateable device 1100 to delete information on the update target controller when the update of at least one controller is completed. In particular, when the update of the at least one controller is completed, the wired updateable device 1100 may delete the information associated with the update target controller.

Meanwhile, the update management apparatus 1200 may be substantially the same as the update management apparatus 100 for a vehicle in FIG. 1.

The vehicle 1000 may include a plurality of controllers 1300. In FIG. 3, the plurality of controllers 1300 is illustrated as including a first controller 1310 and a second controller 1320, but is not limited thereto. The plurality of controllers 1300 may include 'n' ('n' is a natural number equal to or greater than 3) number of controllers.

The plurality of controllers 1300 may communicate with the update management apparatus 1200 (e.g., CAN communication). For example, the update management apparatus 1200 may communicate with the first controller 1310 and the second controller 1320, respectively, and may simultaneously communicate with the first controller 1310 and the second controller 1320 through one vehicle communication. Meanwhile, the number of controllers communicating with the update management apparatus 1200 is not limited to two.

Meanwhile, the vehicle 1000 may be an electric vehicle (EV) or an over-the-air (OTA) updateable vehicle, but is not limited thereto.

The vehicle 1000 may include the wired updateable device 1100, the update management apparatus 1200, and the plurality of controllers 1300, and may perform the update of the plurality of controllers 1300 that requires the update by performing the operation related to the update through the update management apparatus 1200, based on the information stored in the wired updateable device 1100 in a situation where wireless communication with an external update management server is impossible. That is, the vehicle 1000 may be able to perform the update even in a network unavailable area.

Hereinafter, an operating method at a vehicle level according to an embodiment of the present disclosure will be described with reference to FIG. 4

FIG. 4 is a flowchart illustrating an update management method for a vehicle according to an embodiment of the present disclosure.

Referring to FIG. 4, an operating method at level of the vehicle 1000 according to an embodiment of the present disclosure may include an information storage operation (S100) associated with the update target controller, a software version information request operation (S111), a software version information reception operation (S112), a software version information request operation (S121) of the update target controller, a software version information reception operation (S122) of the update target controller, a determination operation (S130) of whether to perform the update, an information request operation (S141) associated with the update of the update target controller, an information reception operation (S142) associated with the update of the update target controller, a determination operation (S151) of whether the update of at least one controller can be performed, an update performing operation (S152), and an information deletion operation (S160) associated with the update target controller.

In the information storage operation (S100) associated with the update target controller, the wired updateable device 1100 may obtain information associated with the update target controller. For example, the wired updateable device 1100 may obtain the information associated with the update target controller through an SD card, a USB, or the like. A user may download the information associated with the update target controller from an OEM site or a map data download application.

In the software version information request operation (S111), the update management apparatus 1200 may request version information of the software installed in the plurality of controllers 1300 to the plurality of controllers 1300. For example, in the software version information request operation (S111), the update management apparatus 1200 may request version information of the software installed in the first controller 1310 and version information of the software installed in the second controller 1320.

In the software version information reception operation (S112), the update management apparatus 1200 may receive version information of the software installed in the plurality of controllers 1300 from the plurality of controllers 1300. For example, in the software version information reception operation (S112), the update management apparatus 1200 may receive the software version information installed in the first controller 1310 from the first controller 1310, and may receive the software version information installed in the second controller 1320 from the second controller 1320.

The operation (S110) of obtaining version information of the software installed in the at least one controller as the above-described may include the software version information request operation (S111) and the software version information reception operation (S112).

In the software version information request operation (S121) of the update target controller, the update management apparatus 1200 may request version information of the software for the update target controller to the wired updateable device 1100.

In the software version information reception operation (S122) of the update target controller, the update management apparatus 1200 may receive version information of the software for the update target controller from the wired updateable device 1100.

The above-described operation (S120) of obtaining the software version information for the update target controller may include the software version information request operation (S121) of the update target controller and the software version information reception operation (S122) of the update target controller.

In the determination operation (S130) of whether to perform the update, the update management apparatus 1200 may compare the version information of the software installed in the at least one controller with the version information of the software for the update target controller obtained from the wired updateable device 1100, and may determine that the update of at least one controller is necessary, when the software version information for the update target controller is more recent. For example, the update management apparatus 1200 may determine that the first controller 1310 needs to be updated, when the version information of the software installed in the first controller 1310 obtained from the wired updateable device 1100 is higher than the current version information of the software installed in the first controller 1310.

The determination operation (S130) of whether to perform the update may be substantially the same as the operation (S130) of determining whether to perform the update in FIG. 2.

In the information request operation (S141) associated with the update of the update target controller, the update management apparatus 1200 may request information associated with the update of the update target controller to the wired updateable device 1100. For example, when it is determined that the update of at least one controller is necessary in the determination operation (S130) of whether to perform the update, the update management apparatus 1200 may request information associated with the update of the update target controller to the wired updateable device 1100. In particular, when it is determined that the update of the first controller 1310 is necessary, the update management apparatus 1200 may request information associated with the update of the first controller 1310.

In the reception operation S142 of the information associated with the update of the update target controller, the update management apparatus 1200 may receive the information associated with the update of the update target controller from the wired updateable device 1100. For example, the update management apparatus 1200 may receive information associated with the update of the first controller 1310.

The above-described obtaining operation (S140) of the information associated with the update of the update target controller may include the information request operation (S141) associated with the update of the update target controller and the information reception operation (S142) associated with the update of the update target controller.

In the determination operation (S151) of whether the update may be performed in at least one controller, the update management apparatus 1200 may determine whether the update of the at least one controller that needs to be updated can be performed. For example, the update management apparatus 1200 may identify information such as whether at least one controller that needs to be updated is in use, whether a storage space is sufficient, and whether vehicle communication (CAN communication) is connected, and then, may determine whether the at least one controller is in an updateable state. Specifically, the update management apparatus 1200 may determine whether the first controller 1310 is in the updateable state.

In the update performing operation (S152), the update management apparatus 1200 may perform the update when it is determined that at least one controller that needs to be updated is capable of performing the update. For example, the update management apparatus 1200 may perform the update of at least one controller based on information associated with the update of the update target controller. In particular, the update management apparatus 1200 may perform the update of the first controller 1310 when the first controller 1310 is in a state that requires an update and is capable of performing the update.

The above-described operation (S150) of performing the update may include the determination operation (S151) of whether the update may be performed in at least one controller and the update performing operation (S152).

In the information deletion operation (S160) associated with the update target controller, the update management apparatus 1200 may request the wired updateable device 1100 to delete information associated with the update target controller when the update is completed. For example, the wired updateable device 1100 may delete information associated with the update target controller when the update of at least one controller is completed. In particular, when the update of the first controller 1310 is finished, the update management apparatus 1200 may request the wired updateable device 1100 to delete information associated with the first controller 1310, and the wired updateable device 1100 may delete information associated with the update of the first controller 1310.

Meanwhile, the update management apparatus 1200 may be substantially the same as the update management apparatus 100 for the vehicle in FIG. 1. For example, in the operating method of the update management apparatus 100 for a vehicle according to an embodiment of the present disclosure, the operation (S160) of requesting to delete information associated with the update target controller may be further included. For example, when the update of the at least one controller is completed in the updating device 130, the information managing device 110 may request the wired updateable device in the vehicle to delete the version information of the software for the update target controller and information associated with the update of the update target controller.

As the above-described, through the operations of the wired updateable device 1100, the update management apparatus 1200, and the plurality of controllers 1300, the vehicle 1000 may perform the update. In particular, the vehicle 1000 may perform the update of the plurality of controllers 1300 based on information stored by the wired updateable device 1100 in a situation where wireless communication with the external update management server is impossible. That is, the update of the vehicle 1000 may be possible without additional network establishment, wireless communication cost, or visit to a service center even in an area where a network is not available.

According to an embodiment of the present disclosure, an update management apparatus for a vehicle may perform an update of vehicle controllers even in a situation in which communication connection with an external server is difficult.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments of the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. An update management apparatus of a vehicle, the apparatus comprising:
   an information managing device configured to obtain information associated with an update target controller from a wired updateable device in the vehicle, and to obtain information associated with at least one controller from the at least one controller;
   a determining device configured to determine whether the at least one controller needs to be updated, based on the information associated with the update target controller and the information associated with the at least one controller; and
   an updating device configured to:
   determine whether the at least one controller is in an updateable state by identifying whether the at least one controller is in use, whether a storage space of the at least one controller is sufficient, and whether vehicle communication is connected; and
   perform an update of the at least one controller, when the at least one controller is in the updateable state and the determining device determines that the update of the at least one controller is necessary based on the information associated with the update target controller, when wireless communication with an external update management server is impossible,
   wherein the information associated with the update target controller includes a controller area network (CAN) ID, a firmware content, a software version, and an update sequence of the update target controller.

2. The apparatus of claim 1, wherein the information associated with the update target controller includes version information of software for the update target controller, and the information associated with the at least one controller includes version information of software installed in the at least one controller, and
   wherein the determining device compares the version information of the software for the update target controller with the version information of the software installed in the at least one controller, and determines that an update of the at least one controller is necessary, when the version information of the software for the update target controller is more recent.

3. The apparatus of claim 1, wherein the information associated with the update target controller includes information associated with an update of the update target controller, and
   wherein the updating device determines whether the at least one controller is in an updateable state, and performs the update of the at least one controller based on the information associated with the update of the update target controller.

4. The apparatus of claim 3, wherein the information managing device requests the wired updateable device in the vehicle to delete the information associated with the update target controller, when the update of the at least one controller is completed.

5. The apparatus of claim 3, wherein the information managing device obtains the information associated with the update of the update target controller from the wired updateable device in the vehicle, when the determining device determines that the update is necessary.

6. The apparatus of claim 1, wherein the wired updateable device in the vehicle is a navigation device, and
   wherein the navigation device stores the information associated with the update target controller in a memory different from a memory in which map information is stored.

7. A method of operating an update management apparatus of a vehicle, the method comprising:
   obtaining, by an information managing device, version information of software installed in at least one controller;
   obtaining, by the information managing device, version information of software for an update target controller from a wired updateable device in the vehicle;
   determining, by a determining device, whether to perform an update based on the version information of the software installed in the at least one controller and the version information of the software for the update target controller;
   obtaining, by the information managing device, information associated with an update of the update target controller from the wired updateable device in the vehicle when it is determined to perform the update in the determining of whether to perform the update;
   determining, by an updating device, whether the at least one controller is in an updateable state by identifying whether the at least one controller is in use, whether a storage space of the at least one controller is sufficient, and whether vehicle communication is connected; and performing, by the updating device, the update based on the information associated with the update of the update target controller when the at least one controller is in the updateable state and the determining device determines that the update of the at least one controller is necessary based on the information associated with the update target controller, when wireless communication with an external update management server is impossible, wherein the information associated with the update target controller includes a controller area network (CAN) ID, a firmware content, a software version, and an update sequence of the update target controller.

8. The method of claim 7, wherein determining whether to perform the update further comprises:

comparing the version information of the software installed in the at least one controller with the version information of the software for the update target controller, and determining that an update of the at least one controller is necessary, when the version information of the software for the update target controller is more recent.

9. The method of claim 8, further comprising:

requesting the wired updateable device in the vehicle to delete the version information of the software for the update target controller and the information associated with the update of the update target controller, when the update is completed in the performing of the update of the at least one controller.

10. The method of claim 7, wherein the wired updateable device in the vehicle is a navigation device, the method further comprising:

storing the version information of the software for the update target controller and information associated with the update of the update target controller in a memory different from a memory in which map information is stored in the navigation device.

11. A vehicle, comprising:

a wired updateable device configured to obtain information associated with an update target controller; and an update management apparatus configured to obtain information associated with at least one controller, to determine whether the at least one controller needs to be updated based on the information associated with the at least one controller and the information associated with the update target controller received from the wired updateable device, and to perform an update of the at least one controller based on the information associated with the update target controller, when wireless communication with an external update management server is impossible, and when the at least one controller is in an updateable state by identifying whether the at least one controller is in use, whether a storage space of the at least one controller is sufficient, and whether vehicle communication is connected, and the determining device determines that the update of the at least one controller is necessary, wherein the information associated with the update target controller includes at least one of a controller area network (CAN) ID, a firmware content, a software version, and an update sequence of the update target controller.

12. The vehicle of claim 11, wherein the information associated with the update target controller includes version information of software for the update target controller, wherein the information associated with the at least one controller includes version information of software installed in the at least one controller, and wherein the update management apparatus compares the version information of the software for the update target controller with the version information of the software installed in the at least one controller, and determines that the update of the at least one controller is necessary when the version information of the software for the update target controller is more recent.

13. The vehicle of claim 12, wherein the information associated with the update target controller includes information associated with an update of the update target controller.

14. The vehicle of claim 11, wherein the wired updateable device is a navigation device, and wherein the navigation device stores the information associated with the update target controller in a memory different from a memory in which map information is stored.

15. The vehicle of claim 11, wherein the update management apparatus requests the wired updateable device to delete the information associated with the update target controller, when the update of the at least one controller is completed.

* * * * *